June 27, 1967

G. M. DOTSON 3,328,656

RECIPROCATING MOTOR CONTROL SYSTEM FOR
MOTORS HAVING HIGH Q SOLENOID COILS

Filed April 24, 1964

Gene M. Dotson
INVENTOR.

BY *Clarence A. O'Brien*
*and Harvey B. Jacobson*
Attorneys

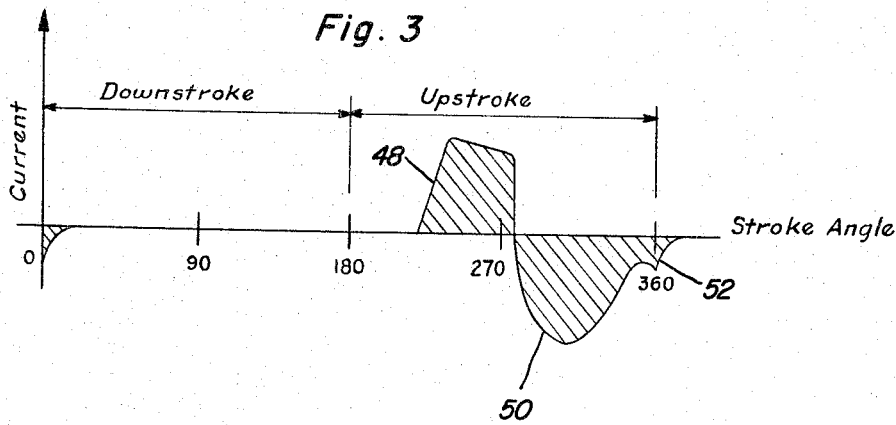
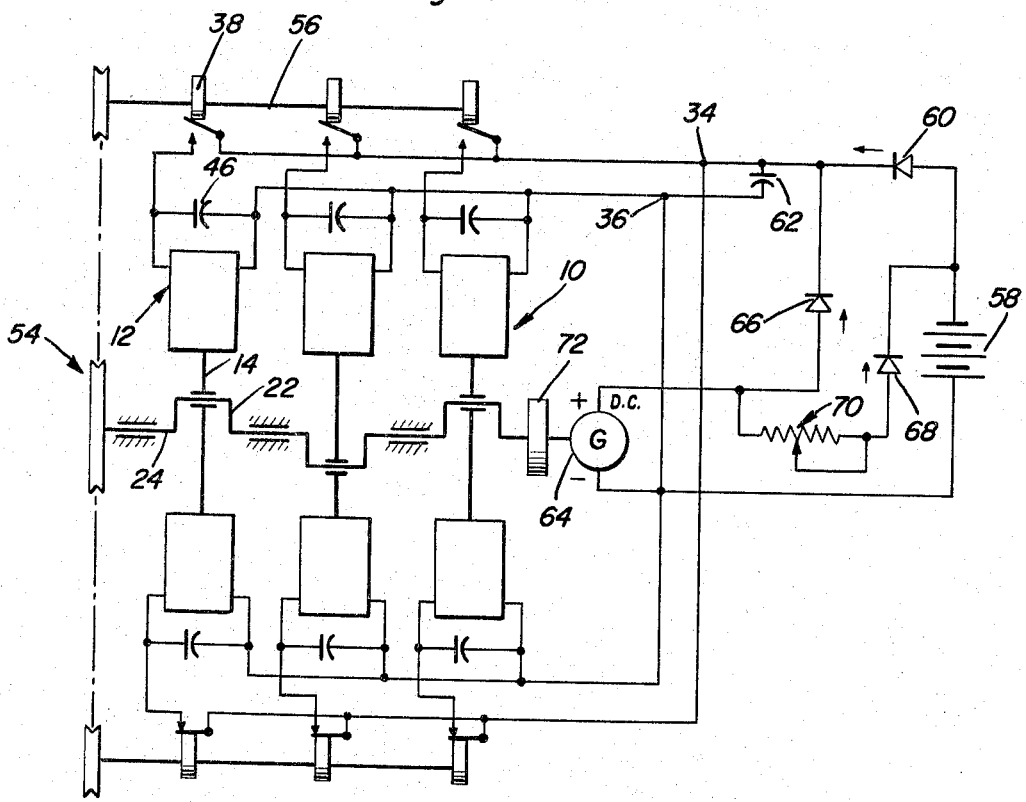
Gene M. Dotson
INVENTOR.

United States Patent Office 3,328,656
Patented June 27, 1967

3,328,656
RECIPROCATING MOTOR CONTROL SYSTEM FOR MOTORS HAVING HIGH Q SOLENOID COILS
Gene M. Dotson, Pleasant Hills, Calif., assignor of fifty percent to Sarah E. Dotson, Pleasant Hills, Calif.
Filed Apr. 24, 1964, Ser. No. 362,243
7 Claims. (Cl. 318—37)

This invention relates to a reciprocating type of engine or motor wherein electrical energy is converted into mechanical energy.

Although solenoid operated reciprocating engines have heretofore been proposed, they have not met with any success because of their inefficiency and inability to produce any substantial mechanical output. It is therefore a primary object of the present invention to provide a solenoid operated reciprocating type of engine wherein conversion from electrical to mechanical energy is achieved in a more efficient manner whereby a mechanical output of substantial magnitude may be produced from available sources of electrical energy.

In accordance with the foregoing object, the engine of the present invention features a reciprocating solenoid plunger through which the output crankshaft is driven. A coil assembly energized so as to impart displacing force to the plunger is designed and arranged so as to have a Q of such high value as to make the production of a sizeable mechanical output attainable. The quality factor of the coil assembly or Q is of course defined by several definitions including the ratio of the reactive volt-amperes to the resistive volt-amperes for a given coil structure, core and operating frequency, the Q also being defined as the ratio of the coil reactance to the coil resistance.

It is known that for a given range of energizing current frequency, a coil assembly may be designed with a maximum Q factor so that the impedance thereof to the energizing current will be relatively low in order to convert energy at a relatively high efficiency. The present invention takes advantage of the foregoing so as to eliminate losses due to hystersis, eddy current and extremely high variation in heavy magnetic flux fields encountered in any attempt to produce a high mechanical output in the reciprocating, solenoid plunger type of engines with which the present invention is concerned. One method by virtue of which the present invention is able to achieve the high Q factor for the coil assembly associated with a reciprocating plunger, is to provide a plurality of coil windings for each solenoid plunger connected in parallel. In this manner, the number of ampere-turns for a given coil space, is increased by an optimum amount as compared to the increase in the coil winding resistance. The coil assembly is thereby able to provide a relatively low resistance, low impedance and high current characteristic, matching a low voltage, high current source such as a storage battery.

As a further object of the present invention, the cyclic supply of energizing current to the coil assemblies are timed in conjunction with the connection of a high capacity storage capacitor across the paralleled windings of the coil assemblies in order to prolong the displacing force applied to the coil plungers involving both the rise and decay of magnetic flux produced by energization and deenergization of the coil assemblies.

A still further object of the present invention is to further increase the Q factor of the coil assemblies by reducing the temperature thereof to super-conductor values.

Another object of the present invention is to provide energy converting coil assemblies as aforementioned in a multi-cylinder engine wherein the voltage source for the coil assemblies is constituted by both a battery and a DC generator driven by the engine crankshaft, the generator and battery being connected in parallel for unidirectional supply of current to the coil assemblies.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a graphical illustration of the current varying characteristics associated with the power unit illustrated in FIGURE 2.

FIGURE 4 is an electrical circuit diagram showing a typical arrangement of a plurality of power units in a reciprocating type of engine.

Figure 1:
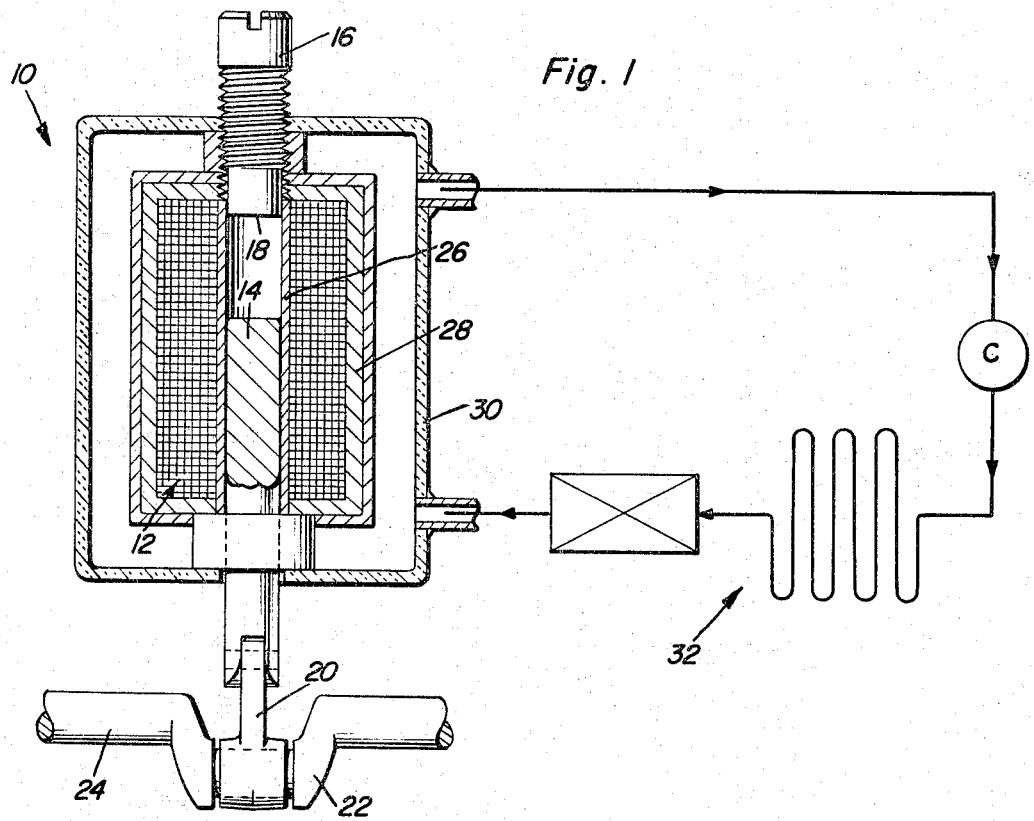
FIGURE 1 is a diagrammatic view of one form of reciprocating power unit made in accordance with the present invention.

Referring now to the drawings in detail, and initially to FIGURE 1, it will be observed that the electromagnetic power unit generally referred to by reference numeral 10 includes a coil assembly generally referred to by reference numeral 12 within which a solenoid plunger 14 is slidably mounted. The plunger is operative upon cyclic energization of the coil assembly to reciprocate through a stroke adjustably limited by the externally threaded adjustment member 16 having an inner stop surface engaged by the plunger at one end of its stroke. The other end of the plunger is pivotally connected to the connecting rod 20 which in turn is pivotally connected to the crank 22 formed on the crankshoft 24 of the engine with which the power unit 10 is associated.

The coil assembly 12 is made up of windings disposed within a cylindrical coil space about the inner coil liner 26 through which the plunger 14 reciprocates. The coil liner is made of a suitable material such as eighty percent brass powder and twenty percent binder made of a polyester resin and hardener for example. The winding space is also defined by the outer cylindrical ferrite cladding 28 made for example, of eightly percent iron powder and twenty percent polyester resin and hardener as the binder. In order to reduce the temperature of the coil assembly to super conductor temperatures for example, and thereby effect a reduction in electrical resistance of the coil wires, the coil assembly may be enclosed within an insulated housing 30 through which coolant may be circulated as diagrammatically shown in FIGURE 1 for cooling the coil in any suitable manner as for example by the refrigerating system 32. Since the concept of reducing the temperature of conductors to super-conducting values is well known, no further disclosure of cooling facilities is deemed necessary for an understanding of the invention. In this latter regard, it will be appreciated that the Q factor of the coil assembly will be effected by the resistance of the windings so that any reduction in such resistance will increase the Q factor and thereby effectively increase the mechanical output of the power unit within the operating speed range or energizing current frequency range corresponding thereto.

Figure 2:
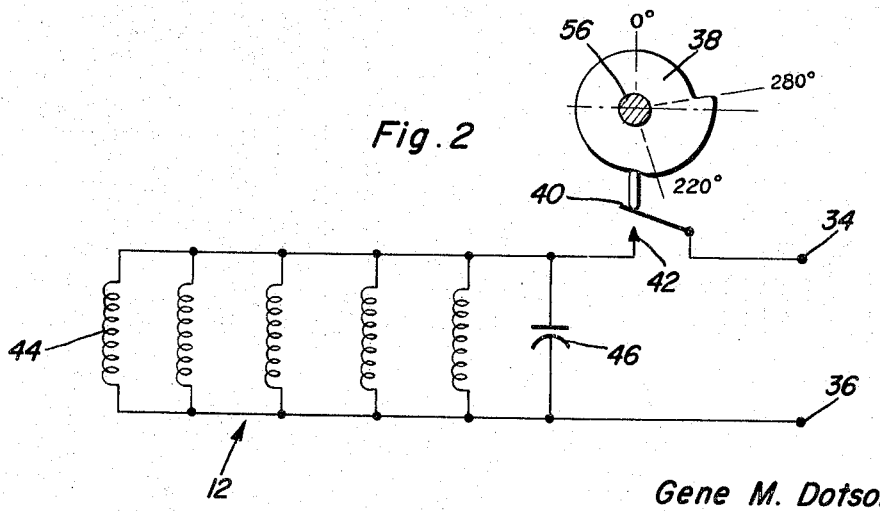
FIGURE 2 is a diagrammatic, electrical circuit corresponding to the power unit illustrated in FIGURE 1.

Referring now to FIGURE 2, it will be observed that the coil assembly 12 is supplied with current from a source of voltage adapted to be connected across the power terminals 34 and 36. The frequency of the energizing current is controlled by the rotational speed of the crankshaft 24 and toward this end a cam member 38 is drivingly connected to the crankshaft so as to the control the opening and closing of the contacts 40 and 42. During each cycle of rotation, the contacts are respectively closed and opened at the 220° and 280° phase positions. It is therefore arranged, that during the upstroke of the plunger, energizing current will flow through the coil windings producing the magnetic field through which the pull or displacing force is imposed on the solenoid plunger. The coil windings consist of a plurality of parallel connected inductive winding sections 44 all disposed within the cylindrical coil space of the coil assembly as aforementioned. Also, connected across the parallel inductive winding sections 44, is a large capacity storage capacitor 46 arranged to store and release energy by continuing flow of current in a direction opposite to the collapsing magnetic field in order to prolong the displacing force on the plunger until it completes its stroke in the upward direction.

Referring to the energizing current trace shown in FIGURE 3, it will be observed that during the upstroke of the plunger, the contacts are closed at the 220° phase position so as to supply energizing current to the coil assembly as depicted by the curve portion 48. At the 280° phase position, the contacts are opened by the cam member 38. Current in the opposite direction continues to flow however from the capacitor 46 as indicated by the curve portion 50 in FIGURE 3 continuing the pull on the plunger as the magnetic field collapses. As the plunger approaches the end of its stroke, a current pip 52 appears on the oscilloscope trace of the current, this pip capable of being increased or decreased by adjusting the upward stroke limit established by the adjustment member 16.

It has been found, that the parallel arrangement of coil windings for the coil assembly produces a larger increase in ampere-turns with decrease in voltage applied than with a single coil, to thereby produce a larger mechanical output inasmuch as the pull on the solenoid plunger is generally proportional to the ampere-turns. It will also be appreciated, that the effective value of the ampere-turns depends upon the Q factor of the coil assembly. It is well known that for a ferrous cored solenoid, the maximum Q is equal to the coil reactance divided by two times the coil resistance ($R_c$), this maximum Q being obtained by proper selection of the coil inductance (L). It is generally known, that for such optimum Q factor, $$L = \frac{R_c R_i}{2\pi f}$$

where $R_c$ is the equivalent series coil resistance, $R_i$ is the equivalent shunt, core loss resistance, and $f$ is the energizing current frequency. Thus, it will be apparent that the coil assembly and the windings thereof may be designed to produce the maximum Q for the operating speed range of the engine with which the power unit is associated. Also, the parallel arrangement of the inductive coil sections and the reduction in the temperature of the coil assembly further reduces the equivalent series resistance of the coil in order to increase the Q thereof. This therefore results in a significant increase in the mechanical output of the engine.

Referring now to FIGURE 4, an installational arrangement of the electromagnetic power units 10 is shown, so that six of such power units may be synchronized for drive of the crankshaft 24. It will therefore be noted that the crankshaft 24 is drivingly connected by the gearing 54 to the cam shafts 56 on which the cam members 38 are mounted in proper angularly spaced phase relation to each other. Each of the coil assemblies will thereby be energized and deenergized in proper sequence during each rotational cycle of the crankshaft 24 as described in connection with FIGURES 2 and 3. Current may be supplied to the power terminals 34 and 36 connected in parallel to each of the power units, from a battery 58. One terminal of the battery is therefore connected through diode 60 to the power terminal 34 while the other terterminal of the battery is connected to the power terminal 36. Also connected across the power terminals 34 and 36, is a capacitor 62. A regenerative voltage supply is also provided in the form of a direct current generator 64 driven by the crankshaft 24 of the engine. One output terminal of the generator is connected by the diode 66 to the power terminal 34 while the other output terminal of the generator is connected to the power terminal 36. Accordingly, the generator and battery are connected in parallel for supply of current to the power units 10. Also a charging circuit connects the generator to the battery including the diode 68 in series with the potentiometer 70. When the output of the generator 64 is higher than that of the battery, this occurring when the crankshaft 24 is being driven within its operating speed range, current will flow from the generator through diode 66 and will be blocked by diode 60 so as to charge the capacitor 62 in order to insure a high current impulse to the coil assemblies when the contacts 42 and 40 are closed by the cam members 38. Diode 66 prevents the output of the battery 48 from being dissipated in the generator when the generator output is lower than that of the battery. Accordingly, the energy stored in the capacitor 62 will be higher with a higher output speed of the engine crankshaft 24 in order to provide higher current pulses for the power units.

From the foregoing description, the construction, operation and utility of the solenoid operated engine of the present invention will be apparent. It will also be appreciated from the foregoing described arrangement of each coil assembly in the engine, that other electronic methods may be used to increase the coil Q value and reduce the resistance thereof such as solid state, regenerative amplifiers, negative resistance devices and other multiplier Q arrangements. The mechanical output of the engine and the energy conversion efficiency will thereby be increased once the principles of the present invention are adopted by correlating the coil design factors to the operating requirements.

Various observations have been made in connection with the performance of the engine. At the high Q operating frequencies of the pulsating current supplied to the unit 12 and associated capacitor 46, resonance occurs so as to form an electrical flywheel effect. When combined with the mechanical flywheel effect of flywheel 72 connected to the engine shaft 24, both electrical and mechanical amplification is obtained. The power unit then becomes self-regenerative and oscillates as long as enough loss sustaining energy is supplied from an outside source. At resonant conditions of the coil unit 12 and capacitor 46, mechanical power may be multiplied regardless of whether the applied voltage and current are out of phase since operation depends on ampere-turns only similar to an electrodynamic AC ammeter or an aluminum disc induction relay. It also becomes evident that the mechanical output power is proportional to the product of the Q factor and the electrical energy input. It can be shown that the operating equation applicable to the motor is $$P = \frac{QIK}{2\pi fL - \frac{1}{2\pi fC}}$$

where P is mechanical power output; I is the coil current; $f$ is the current frequency; L is the inductance of coil unit 12, C is the capacitance of the shunt capacitor 46 and; K is a regenerative factor greater than one which may be empirically determined. Since $2\pi fL$ approaches $1/2\pi fC$ at resonance the value of P will therefore be multipled as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an electrically operated engine having a crankshaft adapted to be driven at a speed within a predetermined operating speed range, a solenoid plunger operatively connected to said crankshaft, a coil assembly slidably mounting said plunger having a plurality of inductive windings connected in parallel, a source of voltage, and cam-operated switch means driven by said crankshaft and operatively connecting said source of voltage to the inductive windings for supply of energizing current thereto at a frequency ($f$) corresponding to said operating speed range of the crankshaft, each of said inductive windings having an inductance value (L), an equivalent series coil resistance (Rc) and an equivalent shunt core-loss resistance (Ri), where $$L = \frac{R_c R_i}{2\pi f}$$

to establish a maximum Q for the coil assembly at said frequency ($f$) of the energizing current, the cam-operated switch means comprising, contacts cyclically closed for conducting said energizing current to impart a displacing force on the plunger during each reciprocating stroke thereof, a cam member drivingly connected to said crankshaft and operatively engageable with the contacts to time the closing and opening of the contacts at 220° and 280° respectively during each cycle, and a storage capacitor connected across the inductive windings for continued supply of energizing current to inductive windings upon opening of the contacts until completion of each stroke.

2. The combination of claim 1 wherein said source of voltage comprises, a battery, a DC generator driven by the crankshaft, unidirectional circuit means connecting the generator in parallel with the battery for supply of current to the coil assembly and charging circuit means connecting the generator to the battery.

3. In an electrically operated engine having a crankshaft adapted to be driven at a speed within a predetermined operating speed range, a solenoid plunger operatively connected to said crankshaft, a coil assembly slidably mounting said plunger having a plurality of inductive windings connected in parallel, a source of voltage, and cam-operated switch means driven by said crankshaft and operatively connecting said source of voltage to the inductive windings for supply of energizing current thereto at a frequency ($f$) corresponding to said operating speed range of the crankshaft, each of said inductive windings having an inductance value (L), an equivalent series coil resistance (Rc) and an equivalent shunt core-loss resistance (Ri), where $$L = \frac{R_c R_i}{2\pi f}$$

to establish a maximum Q for the coil assembly at said frequency ($f$) of the energizing current, said source of voltage comprising, a battery, a DC generator driven by the crankshaft, unidirectional circuit means connecting the generator in parallel with the battery for supply of current to the coil assembly and charging circuit means connecting the generator to the battery.

4. The combination of claim 3 wherein the cam-operated switch means comprises, contacts cyclically closed for conducting said energizing current to impart a displacing force on the plunger during each reciprocating stroke thereof, a cam member drivingly connected to said crankshaft and operatively engageable with the contacts to time the closing and opening of the contacts, and a storage capacitor connected across the inductive windings for continued supply of energizing current to the inductive windings upon opening of the contacts until completion of each stroke.

5. In an energy conversion system, a low frequency oscillator comprising, a mechanically loaded coil assembly having a plurality of solenoid windings connected in parallel, a storage capacitor connected in parallel with said windings of the coil assembly, a power supply terminal connected to said coil assembly, and current interrupting switch means connected in series between said power supply terminal and the coil assembly for limiting flow of current through said solenoid windings to a predetermined frequency, each of said solenoid windings having an inductance value establishing a maximum ratio of coil reactance to coil resistance for the coil assembly at said predetermined frequency.

6. In a system for converting electrical energy into mechanical energy, mechanical output means adapted to be driven at an operating frequency, solenoid means having a coil resistance and inductance establishing a maximum ratio of coil reactance to coil resistance when energized at said operating frequency, means drivingly connecting the solenoid means to the mechanical output means for drive thereof at said operating frequency, regenerative power means connected to said mechanical output means for energization of said solenoid means at the operating frequency, and capacitive means connected across said solenoid means for reducing power loss in the regenerative power means.

7. The combination of claim 6 wherein said regenerative power means includes, a generator driven by the output means, unidirectional conducting means connected to said generator for supply of current to the solenoid means, a battery connected to said conducting means in parallel with the generator, charging circuit means interconnecting the battery and the generator and current interrupting means driven by the output means and connecting the conducting means to the solenoid means.

References Cited

UNITED STATES PATENTS

| | | | |
|---|---|---|---|
| 1,239,831 | 9/1917 | Simpson | 331—165 |
| 1,349,100 | 8/1920 | Reynolds | 310—24 |
| 1,692,050 | 11/1928 | Parrish | 318—122 |
| 1,886,040 | 11/1932 | Moodyman | 310—35 X |
| 2,056,719 | 10/1936 | Gelnaw | 310—35 X |
| 2,296,554 | 9/1942 | Hinchman | 310—24 X |
| 2,338,005 | 12/1943 | Morch | 310—24 |
| 2,623,699 | 12/1952 | Smith | 318—134 X |
| 3,161,809 | 12/1964 | Swartz | 317—158.1 |
| 3,172,027 | 3/1965 | Bourke et al. | 318—134 X |
| 3,252,018 | 5/1966 | Drautman | 310—16 |

OTHER REFERENCES

Electrical Engineers' Handbook—electric communications electronics, Pender and McIlwain, 4th edition, John Wiley and Sons., Inc., New York, pp. 3-48-3-50.

MILTON O. HIRSHFIELD, *Primary Examiner.*

D. F. DUGGAN, *Assistant Examiner.*